Figure 1:
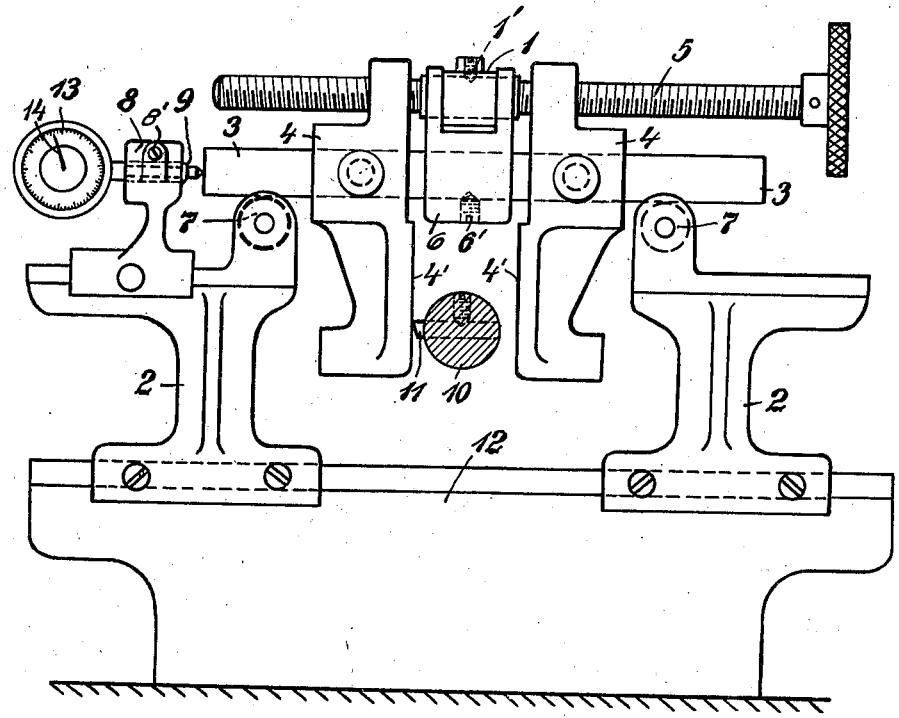

May 2, 1939.  P. JESCHOR  2,156,500
BORING MACHINE GAUGE
Filed Dec. 16, 1936  3 Sheets-Sheet 1

Inventor
PAUL JESCHOR
by Walter S. Bleistein
ATTORNEY

May 2, 1939.    P. JESCHOR    2,156,500
BORING MACHINE GAUGE
Filed Dec. 16, 1936    3 Sheets-Sheet 2

INVENTOR.
PAUL JESCHOR
BY Walter S. Bleustein
ATTORNEY.

May 2, 1939.    P. JESCHOR    2,156,500
BORING MACHINE GAUGE
Filed Dec. 16, 1936    3 Sheets-Sheet 3

INVENTOR.
PAUL JESCHOR
BY Walter S. Bleustein
ATTORNEY.

Patented May 2, 1939

2,156,500

UNITED STATES PATENT OFFICE 2,156,500

BORING MACHINE GAUGE

Paul Jeschor, Breslau, Germany

Application December 16, 1936, Serial No. 116,083
In Germany February 7, 1936

8 Claims. (Cl. 33—185)

The present invention relates to boring or drilling machines and more particularly, to apparatus for setting the cutting tools of such machines.

For accurate boring, especially in the bearings and cylinders of internal combustion engines, fine boring machines having a horizontal or vertical arrangement of the boring spindle are principally employed. In order to adjust or set the boring tools of these machines, usually constructed as single cutter tools, the use of several measuring devices has hitherto been necessary. First, the diameter of the journal, piston or the like intended for the particular bore is numerically ascertained by a measuring device, and then the boring tool is adjusted by a further measuring device to the numerically ascertained diameter of the journal, piston or the like. The employment of several measuring devices has the drawback that errors of measurement may easily occur, which lead to inaccuracies in the bores made, and inaccuracies also frequently occur owing to the measuring devices differing from each other.

The invention provides an apparatus for the setting of the tools of fine boring machines by which the setting is simplified and the accuracy of the bores is improved. The new setting device, according to the invention consists of a gauge or feeler device adjustable to the diameter of the journal, piston or the like to run later in the bearing, cylinder or the like to be machined, this feeler device being inserted in the boring machine so as to be displaceable transversely to the axis of the boring spindle, where its displacements can be indicated by an indicating device.

The gauge or feeler device can consist of two members adjustable uniformly relative to each other along a guide and is to be mounted with its guide on open bearing blocks on the boring machine so as to be displaceable transversely to the axis of the boring spindle. A measuring dial is arranged on one bearing block, the feeler pin of which is influenced by one end of the guide carrying the measuring members.

The invention provides a method of setting the tool of a boring machine which consists in setting the opposed faces of a gauge by direct contact thereof with a part to fit in the bore to be cut, arranging said gauge in the machine with the said faces on opposite sides of the boring spindle, rotating the spindle with the tool between said faces and observing whether the gauge is displaced by engagement of the tool with said faces.

Figure 4:
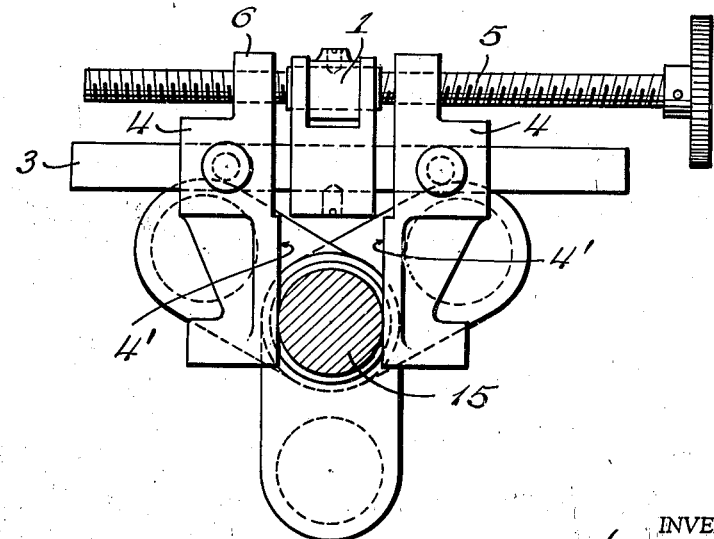
Figure 5:
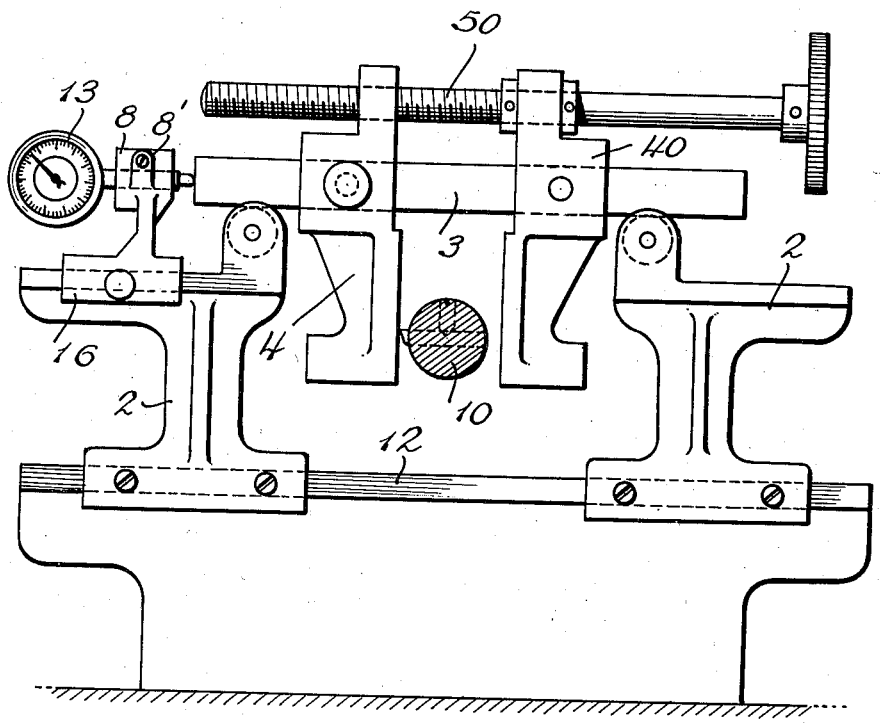

Further objects and details of the invention will be apparent from the description hereinafter and the accompanying drawings illustrating embodiments thereof by way of example. In the drawings, Fig. 1 is an elevation of a boring machine with a horizontal boring spindle and a setting device according to the invention, Fig. 2 is a top plan view thereof, Fig. 3 is a side view of a part of Fig. 1, Fig. 4 is an elevation of the setting device of Fig. 1 applied to a crank shaft preparatory to adjusting the boring tool of Fig. 1, and Fig. 5 is an elevation similar to Fig. 1, of a boring machine with a modified setting device.

Figure 2:
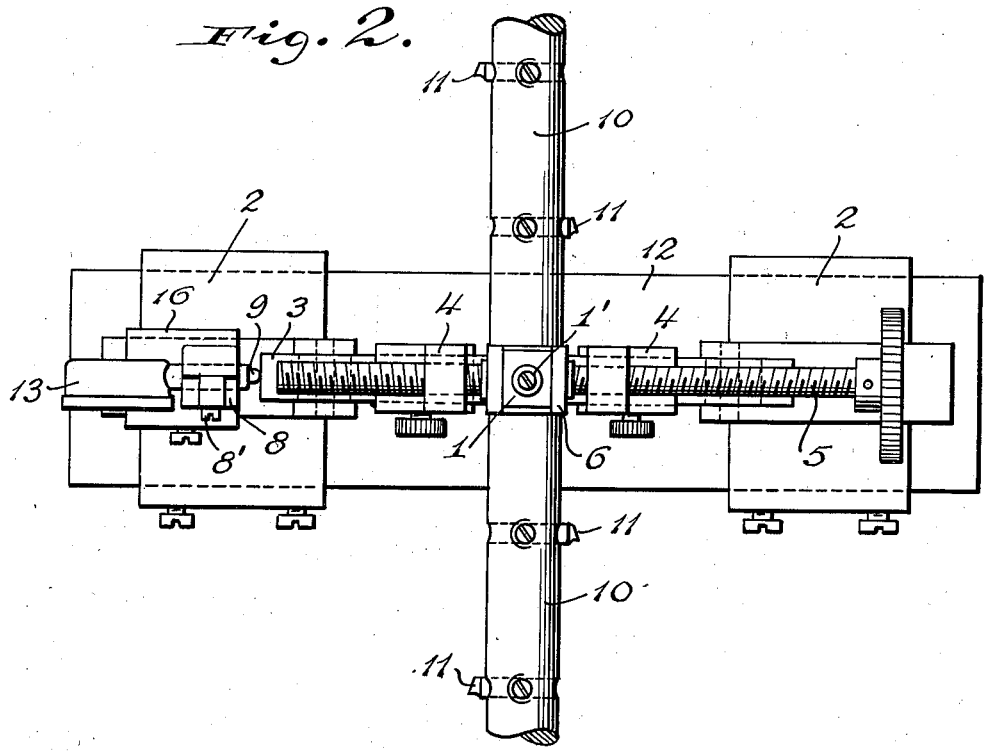
Figure 3:
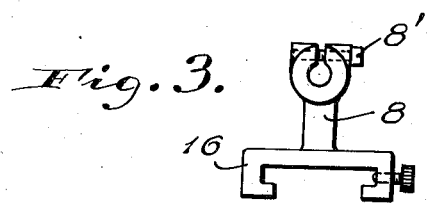

To ascertain the diameter of the journal, piston or the like which is to run later in the bearing, cylinder or the like to be machined, a gauge or feeler device is employed as shown in Figs. 1 and 2. The feeler device comprises two members 4, having feeler surfaces 4', adjustable on a guide-rod 3. The members 4, 4 are adjustable relative to each other by a spindle 5, having right and left hand threads, and a collar 1 secured to the spindle 5 for instance by means of a screw 1'. The spindle is so rotatable in but restrained from lateral movement relatively to a bearing 6 fastened on the guide 3 for instance by means of a screw 6', that the feeler surfaces 4' are always at equal distances from the middle or from the ends of the rod.

This feeler device for ascertaining the diameter of the journal or the like intended for the particular bore is directly employed for the setting of the boring tool. For this purpose, supports 2 are fastened on the bed 12 of the boring machine, on which supports the feeler device, after the members 4, 4 are adjusted to the diameter of the journal, can be mounted so as to be displaceable transversely to the axis of the boring spindle 10. In the construction shown, the supports 2 have rollers 7 on which the guide-rod 3 of the feeler device is movable transversely to the axis of the boring spindle. On one of the supports 2 a further bearing 8 is provided so as to hold therein with the aid of a clamping screw 8' a measuring dial 13, the feeler pin 9 of which lies in the long axis of the guide-rod 3 of the feeler device and is influenced by the end of the rod.

The setting device is used in the following way: First, the feeler device is placed on the journal, piston or the like intended for the bore to be made, for instance on a crank shaft journal 15 as shown in Fig. 4. Then, the spindle 5 is rotated until the members 4 bear on the journal with the feeler surfaces 4'; the spacing of the surfaces 4' thus corresponds to the diameter of the journal. Thereupon, the feeler device with the guide-rod 3 is laid on the rollers 7 of the supports 2 and moved to such an extent that one end of the rod 3 touches the feeler pin 9 of the measuring dial 13. After the boring spindle 10 is advanced until the tool or boring cutter 11 enters the space between the feeler surfaces 4', the tool 11 is so set that on the rotation of the boring spindle it just touches both feeler surfaces 4' without deflecting the pointer 14 of the measuring dial 13.

When this position is reached, the diameter of the circle described by the point of the tool exactly corresponds to the spacing of the feeler surfaces 4' and thus to the diameter of the journal piston or the like intended for the bore to be made.

If the feeler device has two members uniformly adjustable relative to each other, as in the example of construction illustrated, and if the feeler pin 9 is located at a suitable distance from the axis of the boring spindle with reference to the length of the guide rod 3, the position is shown on the measuring dial 13 in which the two surfaces 4' of the jaws 4 of the feeler device 1 have exactly the same distance from the axis of the drilling spindle. In this case, it is not necessary by turning the drilling spindle to ascertain whether the point of the drilling tool just touches the two feeler surfaces 4'. On the contrary, in this construction the feeler device, after placing the guide rod 3 on the supports is moved until the pointer 14 of the measuring dial 13 stands somewhat in advance of the graduation or marking provided on this latter. The tool is then adjusted to such an extent by means of its setting device, and thus the feeler device 1 displaced on the rollers 7 to such an extent, until the pointer 14 of the measuring dial exactly stands at the graduation.

It is not absolutely necessary for both members of the feeler device to be uniformly adjustable relative to each other on the guide. As shown in Fig. 5, the feeler device may even have only one member 4 adjustable, and the other member 40 fixed as to its distance from the ends of the spindle 50 and guide rod 3. Measuring dial 13 is mounted so as to be adjustable transversely to the axis of the boring spindle. Figs. 3 and 5 illustrate a foot 16 of bearing 8 which serves this purpose.

As the bore to be made must usually have a somewhat larger diameter than the corresponding journal, piston or the like, the boring tool must be adjusted to a correspondingly larger diameter than the journal, piston or the like. This can be done in a simple manner by a further adjustment of the tool 11, while the increase in the diameter relative to the diameter of the journal can be read off and exactly adjusted on the measuring dial 13.

The new adjusting device is applicable not only to the adjustment of single cutter boring tools, but also for the adjusting of spindles having several cutters arranged one behind the other, as illustrated in Fig. 2.

I claim:

1. Setting apparatus for the tools of boring machines comprising a feeler device including a guide rod and two relatively displaceable members, said members being mounted on said guide rod and having opposed feeler surfaces adapted to be spaced according to the diameter of a bore to be cut, a support adapted to receive the guide rod to support the feeler device in a boring machine including a boring spindle with a tool therein, and to hold said device with said members on opposite sides of the boring spindle, said guide rod being movable relatively to said support in a direction transversely of the boring spindle axis, and indicator means adapted for engagement by said guide rod to indicate such movement of the feeler device as may be caused by engagement of the tool with a feeler surface of said feeler device when the tool is set to cut at a diameter greater than the spacing of said feeler surfaces.

2. Setting apparatus for the tools of boring machines comprising a removable feeler device including a guide rod and two relatively displaceable members mounted on said guide rod and having opposed feeler surfaces, two supports adapted to receive the guide rod to support the feeler device in a boring machine including a boring spindle with a tool therein, and to hold said feeler device with said members on opposite sides of the boring spindle, said guide rod being movable relatively to said supports in a direction transversely of the boring spindle axis, and indicator means mounted on one of said supports and being adapted for engagement by said guide rod to indicate such movement of the feeler device as may be caused by engagement of the tool with a feeler surface of said feeler device when the tool is set to cut at a diameter greater than the spacing of said feeler surfaces.

3. A setting apparatus for the tools of a boring machine, comprising a feeler device including members having opposed feeler surfaces adapted to be spaced according to the diameter of an element for use in the bore to be cut, means for spacing said members, means for supporting said device in a boring machine including a tool rotatable about an axis, with said surfaces disposed on opposite sides of said axis, said feeler device being movable relatively to said supporting means in a direction transverse to the axis of the boring spindle, and indicator means adapted to indicate such movement of the feeler device as may be caused by engagement of the tool with a feeler surface of said feeler device when the tool is set to cut at a diameter greater than the spacing of said feeler surfaces.

4. Setting apparatus for the tools of boring machines comprising a gauge having two members with opposed feeler surfaces, means for spacing said surfaces according to the diameter of a bore to be cut, and means for supporting said gauge in operative position relative to a cutting tool of a boring machine, said gauge being movably mounted on said supporting means so as to be shiftable in a direction transverse to said feeler surfaces.

5. A setting apparatus for the tool of a boring machine comprising a gauge including members with opposed feeler surfaces and means for spacing said surfaces according to the diameter of a bore to be cut, supporting means for said gauge, said supporting means being adapted to carry said gauge movable relatively to said supporting means and with said surfaces disposed on opposite sides of the tool of a boring machine to which the apparatus may be applied, and indicator means for indicating movement of said gauge relatively to said supporting means.

6. A setting apparatus for the tools of a boring machine, comprising a gauge including two members having opposed feeler surfaces, and means for spacing said surfaces, supporting means for supporting said gauge in a boring machine including a tool rotatable about an axis, and for holding said gauge with said surfaces on opposite sides of said axis, said gauge being movable relatively to said supporting means and transversely to said surfaces, and indicator means for indicating movement of said gauge relative to said supporting means.

7. A setting apparatus for the tools of a boring machine, comprising a gauge including two members having opposed feeler surfaces, and means for spacing said surfaces, supporting means for supporting said gauge in a boring machine including a tool rotatable about an axis, and for holding said gauge with said surfaces on opposite sides of said axis and indicator means, said gauge being movable relatively to said supporting means in a direction transverse to said surfaces, and being bodily removable from said supporting means and said indicator means, said indicator means being adapted to indicate movement of said gauge relative to said supporting means.

8. A setting apparatus for the tools of a boring machine, comprising a gauge including two members having opposed feeler surfaces, and means for spacing said surfaces, supporting means for supporting said gauge in a boring machine including a tool rotatable about an axis and for holding said gauge with said surfaces on opposite sides of said axis, said gauge being movable relatively to said supporting means in a direction transverse to said surfaces, and indicator means for indicating movement of said gauge relative to said supporting means, said indicator means being adjustable with respect to said supporting means, a member operatively connected to said indicator means and projecting in the path of said gauge so as to be engaged by the latter when the gauge has traveled beyond a predetermined point.

PAUL JESCHOR.